United States Patent
Hemphill et al.

(10) Patent No.: US 9,937,869 B2
(45) Date of Patent: Apr. 10, 2018

(54) VEHICLE STORAGE BOX INCORPORATING A STANDARD INTERFACE PLATE CONNECTION

(71) Applicant: Ford Global Technologies, LLC, Dearborn, MI (US)

(72) Inventors: Joshua Hemphill, White Lake, MI (US); Jack Marchlewski, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 361 days.

(21) Appl. No.: 14/668,065

(22) Filed: Mar. 25, 2015

(65) Prior Publication Data

US 2016/0280144 A1    Sep. 29, 2016

(51) Int. Cl.
| | | |
|---|---|---|
| *B60R 7/00* | (2006.01) | |
| *B60R 9/00* | (2006.01) | |
| *B60R 9/06* | (2006.01) | |
| *B60P 7/08* | (2006.01) | |
| *B62D 33/02* | (2006.01) | |

(52) U.S. Cl.
CPC .................. *B60R 9/06* (2013.01); *B60P 7/08* (2013.01); *B62D 33/0207* (2013.01)

(58) Field of Classification Search
CPC .......... B60R 9/06; B62D 33/0207; B60P 7/08
USPC ........ 224/404, 403; 414/462; 296/37.6, 37.8
See application file for complete search history.

(56) References Cited

U.S. PATENT DOCUMENTS

| | | | | |
|---|---|---|---|---|
| 3,664,704 A | * | 5/1972 | Ellis ........................ | B60P 7/08 224/404 |
| 3,727,971 A | * | 4/1973 | Sisler ................... | B60K 15/073 224/404 |
| 4,705,317 A | * | 11/1987 | Henri ..................... | B62D 33/02 224/404 |
| 4,728,017 A | * | 3/1988 | Mullican .................. | B60R 9/00 224/328 |
| 5,303,969 A | * | 4/1994 | Simnacher ............. | B60R 11/06 224/494 |
| 5,398,987 A | * | 3/1995 | Sturgis ..................... | B60R 9/00 224/404 |

(Continued)

*Primary Examiner* — Nathan J Newhouse
*Assistant Examiner* — Lester L Vanterpool
(74) *Attorney, Agent, or Firm* — Jason Rogers; Price Heneveld LLP

(57) ABSTRACT

A vehicle-bed storage box includes a container having an interior volume, an interface plate disposed within a vehicle-bed sidewall that selectively receives the container against the vehicle-bed sidewall and over a vehicle-bed wheelhouse, the interface plate including a securing recess and an interface bracket extending from at least one sidewall, the interface bracket including a rotating mechanism operable between a plurality of rotational positions, including an engaged position and a secured position when the interface bracket is received by the interface plate, the engaged position being defined by the rotating mechanism being free of engagement with the securing recess and further defined by the interface bracket being at least partially operable within the interface plate, and wherein the secured position is defined by the rotating mechanism being engaged within the securing recess and the interface bracket being substantially free of movement within the interface plate.

16 Claims, 9 Drawing Sheets

(56) References Cited

U.S. PATENT DOCUMENTS

| | | | | |
|---|---|---|---|---|
| 5,501,338 | A * | 3/1996 | Preston | A45C 11/20 206/499 |
| 5,535,931 | A * | 7/1996 | Barlow | B60R 7/02 224/403 |
| 5,784,769 | A * | 7/1998 | Clare | B60R 11/06 224/404 |
| 5,848,818 | A * | 12/1998 | Flueckinger | B60R 9/00 296/100.02 |
| 5,979,617 | A * | 11/1999 | Clare | B60J 10/00 188/322.12 |
| 6,007,128 | A * | 12/1999 | Hines, Jr. | B60R 9/00 224/282 |
| 6,139,080 | A * | 10/2000 | Saffold | B60R 9/00 292/145 |
| 6,422,629 | B2 * | 7/2002 | Lance | B60R 11/00 224/403 |
| 6,464,277 | B2 | 10/2002 | Wilding | |
| 6,523,877 | B1 * | 2/2003 | Damian | B60R 9/00 224/404 |
| 6,547,299 | B2 * | 4/2003 | Atanasiu | B60R 7/04 224/281 |
| 6,886,876 | B1 * | 5/2005 | Damian | B60R 9/00 224/404 |
| 6,913,304 | B1 | 7/2005 | Sweet | |
| 7,004,323 | B1 * | 2/2006 | Symonds | A45C 11/20 206/542 |
| 7,055,724 | B2 * | 6/2006 | Farentinos | B60R 9/00 224/403 |
| 7,182,177 | B1 * | 2/2007 | Simnacher | B66F 3/12 224/404 |
| 8,393,665 | B2 * | 3/2013 | Villano | B60R 11/06 224/403 |
| 8,567,650 | B2 * | 10/2013 | Read | B60R 9/065 224/404 |
| 9,096,180 | B1 * | 8/2015 | Malin | B60R 9/065 |
| 9,193,290 | B2 * | 11/2015 | Lazarevich | B60P 3/14 |
| 2006/0091689 | A1 | 5/2006 | Wilding | |
| 2012/0200106 | A1 * | 8/2012 | Villano | B60R 11/06 296/37.6 |
| 2012/0256438 | A1 * | 10/2012 | Watkins | B60R 11/06 296/37.6 |
| 2014/0021232 | A1 | 1/2014 | Lazarevich et al. | |
| 2014/0346205 | A1 * | 11/2014 | Roach | B60P 7/0892 224/404 |
| 2015/0129626 | A1 * | 5/2015 | Malin | B60R 9/065 224/404 |

* cited by examiner

US 9,937,869 B2

VEHICLE STORAGE BOX INCORPORATING A STANDARD INTERFACE PLATE CONNECTION

FIELD OF THE INVENTION

The present invention generally relates to storage boxes that can be disposed within vehicles, and more specifically, a removable storage box that can be attached to a vehicle bed or storage area through a standard interface plate connection.

BACKGROUND OF THE INVENTION

There are various storage boxes and ramp boxes that can be installed on a vehicle to assist a user in transporting various items, such as, tools, vehicle ramps, athletic equipment, building materials and the like. Such boxes are typically installed on top of or above a bed rail of a vehicle or on the roof in order to keep the accessory items in a high location so as not to interfere with the sight lines of the vehicle. These storage boxes and ramp boxes can interfere with the operation of the vehicle because of a high center of gravity caused by the placement of these containers. Additionally, the storage containers can cause unwanted lateral forces to be applied on the vehicle during operation.

SUMMARY OF THE INVENTION

According to one aspect of the present invention, a vehicle-bed storage box includes a container having an interior volume defined by sidewalls and a base of the container. An interface plate disposed within a vehicle-bed sidewall selectively receives an interface bracket to position the container against the vehicle-bed sidewall and over a vehicle-bed wheelhouse. The interface plate includes a securing recess at least partially defined by an inward surface of the interface plate. An interface bracket extends from at least one sidewall. The interface bracket includes a rotating mechanism operable between a plurality of rotational positions. The plurality of rotational positions of the rotating mechanism includes an engaged position and a secured position when the interface bracket is received by the interface plate. The engaged position is defined by the rotating mechanism being free of engagement with the securing recess and further defined by the interface bracket being at least partially operable within the interface plate. The secured position is defined by the rotating mechanism being engaged within the securing recess and the interface bracket being substantially free of movement within the interface plate.

According to another aspect of the present invention, a vehicle-bed storage box includes a container having a back wall, a base and an interior volume defined at least by the base. An interface bracket is disposed within the back wall and perpendicularly extends from an exterior surface of the container. An interface plate is disposed within a vehicle-bed sidewall that selectively receives the interface bracket to position the container against the vehicle-bed sidewall and over a vehicle-bed wheelhouse.

According to another aspect of the present invention, a vehicle-bed storage box includes a container having a back wall, a base and an interior volume defined at least by the base. An interface bracket is disposed within the back wall and perpendicularly extends from an exterior surface of the container. An interface plate is disposed within a vehicle-bed sidewall that selectively receives the interface bracket to position the container against the vehicle-bed sidewall and over a vehicle-bed wheelhouse.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
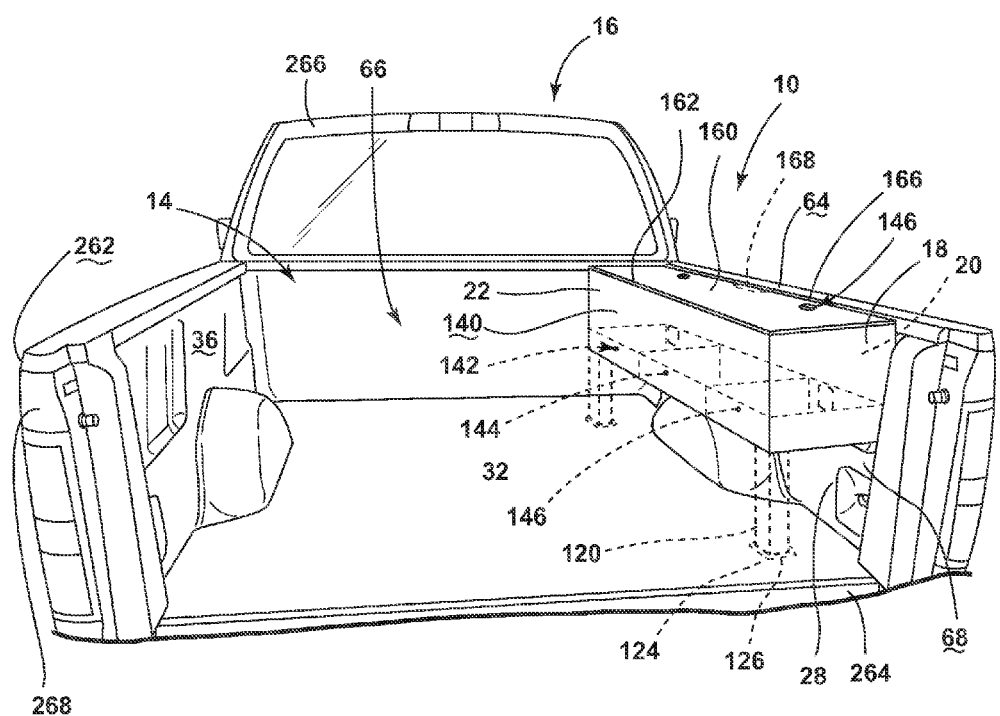
FIG. 1 is a rear perspective view of a vehicle with an embodiment of the standard interface box installed.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As shown in FIGS. 1-7, reference numeral 10 generally refers to a vehicle-bed storage box that can be installed as part of a standard interface plate assembly 12 within the vehicle bed 14 of a pickup truck or other vehicle 16, according to at least one embodiment. The vehicle-bed storage box 10 includes a container 18 having an interior volume 20 defined by sidewalls 22 and a base 24 of the container 18. An interface plate 26 is disposed within a vehicle-bed sidewall 28 that selectively receives an interface bracket 30 of the container 18 in order to position the container 18 against the vehicle-bed sidewall 28 and over a vehicle-bed wheelhouse 32. The interface plate 26 includes a securing recess 34 that at least partially defines an inward surface 36 of the interface plate 26. The interface bracket 30 extends from at least one of the sidewalls 22 of the container 18. The interface bracket 30 includes a rotating mechanism 38 operable between a plurality of rotational positions. A plurality of rotational positions of the rotating mechanism 38 includes an engaged position 40 and a secured position 42 when the interface bracket 30 is received by the interface plate 26. The engaged position 40 of the rotating mechanism 38 is defined by the rotating mechanism 38 being free of engagement with the securing recess 34 and further defined by the interface bracket 30 being at least partially operable within the interface plate 26. The secured position 42 is defined by the rotating mechanism 38 being engaged with the securing recess 34 and the interface bracket 30 being substantially free of movement within the interface plate 26, such that the interface bracket 30 is selectively locked within the interface plate 26 and the securing recess 34. It is contemplated that the engagement between the interface bracket 30 and the interface plate 26, in various embodiments, can only be achieved when the rotating mechanism 38 is in the engaged position 40.

Referring again to FIGS. 2-7, the interface bracket 30 of the container 18 is configured to extend perpendicularly from a sidewall 22 of the container 18. The interface plate 26 of the vehicle bed 14 can be positioned vertically within the vehicle-bed sidewall 28 proximate the vehicle bed 14. In this manner, the selective engagement between the interface bracket 30 and the interface plate 26 provides primary vertical support for positioning the container 18 proximate the vehicle-bed sidewall 28 and also over the vehicle-bed wheelhouse 32. Accordingly, the primary engagement between the vehicle-bed storage box 10 and the vehicle bed 14 is between the sidewall 22 of the container 18 and the vehicle-bed sidewall 28.

According to various embodiments, the interface plate 26 may be positioned on a non-vertical surface of the vehicle 16. Such locations may include, but are not limited to, the under carriage, a portion of the vehicle-bed wheelhouse 32, or other similar portion of the vehicle 16.

Referring again to FIGS. 3-7, it is contemplated that the rotating mechanism 38 of the interface bracket 30 can include a substantially oblong flange 50 that can be rotated between the engaged and secured positions 40, 42 and can engage the slot 52 of the interface plate 26. In such a configuration, the slot 52 of the interface plate 26 can be shaped to substantially match the configuration of the oblong flange 50 of the rotating mechanism 38. In this manner, when the oblong flange 50 of the rotating mechanism 38 is in the engaged position 40, the flange can be moved through the oblong slot 52 of the interface plate 26. Once disposed therein, the rotating mechanism 38 can be moved to the secured position 42 such that the configuration of the oblong flange 50 of the rotating mechanism 38 is moved to be substantially out of alignment or, in some embodiments, perpendicular to the oblong configuration of the slot 52 of the interface plate 26. In this manner, the configuration of the oblong flange 50 of the rotating member is configured to be misaligned with the oblong configuration of the slot 52 of the interface plate 26 such that the oblong flange 50 of the rotating mechanism 38 cannot be removed from the interface plate 26 without first rotating the oblong flange 50 back to the engaged position 40 such that the configuration of the oblong flange 50 again matches the oblong configuration of the slot 52 of the interface plate 26.

Referring again to FIGS. 1-6, the container 18 can include an upper rim 60 that defines an aperture 62 through which the interior volume 20 of the container 18 can be accessed for placing and removing various items to be positioned within the interior volume 20. When the interface bracket 30 and interface plate 26 are engaged such that the vehicle-bed storage box 10 is positioned proximate the vehicle bed 14, the upper rim 60 of the container 18 is disposed below a top surface 64 of the vehicle-bed sidewall 28. Additionally, in this configuration, the base 24 of the container 18 is free of engagement with the vehicle-bed wheelhouse 32, such that the base 24 of container 18 is positioned above and free of engagement with the vehicle-bed wheelhouse 32. Through this configuration, the vehicle-bed storage box 10, when installed within the vehicle bed 14, has a substantially low center of gravity within the vehicle-bed volume 66 defined by the vehicle-bed sidewalls 28 and the vehicle-bed surface 68. In this manner, during use of the vehicle-bed storage box 10, lateral forces placed upon the vehicle 16 while turning the vehicle 16 and during other vehicle maneuvers are not substantially increased as a result of the installation of the vehicle-bed storage box 10. Additionally, the interior volume 20 of the vehicle-bed storage box 10 is substantially accessible due to the positioning of the upper rim 60 of the container 18 at a position substantially even with the top surface 64 of the vehicle-bed sidewall 28. Additionally, the vehicle-bed storage box 10 is configured to take up a minimal amount of space within the vehicle-bed volume 66 due to the engagement of only one sidewall 22 of the container 18 with the vehicle-bed sidewall 28. Accordingly, the remaining sidewalls 22 and base 24 of the container 18 remain substantially free of direct engagement with the vehicle-bed sidewalls 28 and the vehicle-bed surface 68. This configuration allows substantially all of the vehicle-bed surface 68 to remain usable when one or more vehicle-bed storage boxes 10 are installed within the vehicle bed 14.

Referring now to FIGS. 3-7, the vehicle-bed storage box 10 can include at least one removable dividing wall 80. To position and substantially support the removable dividing wall 80, the container 18 can include at least one wall cleat 82 that is positioned on an interior surface 84 of the container 18. In this manner, the at least one wall cleat 82 cooperates with the removable dividing wall 80 to position the removable dividing wall 80 within the interior volume 20. The one or more removable dividing walls 80 of the container 18 can serve to divide the interior volume 20 of the vehicle-bed storage box 10 into a plurality of sub compartments 86 for placing items within the vehicle-bed storage box 10 and also organizing those items within the interior volume 20. According to the various embodiments, each removable dividing wall 80 can include various sub containers, pockets, hooks, hangers, shelves, and other smaller storage compartments for containing and organizing items within the interior volume 20 of the vehicle-bed storage box 10.

Referring again to FIGS. 4-7, the vehicle-bed storage box 10 can include at least one removable tray 100 that is selectively disposed within the interior volume 20 of the container 18. It is contemplated that the interior surface 84 of the container 18 can include a tray cleat 102 that supports the removable tray 100 within the interior volume 20 of the container 18. Additionally, it is contemplated that the one or more removable dividing walls 80 can also include at least one tray cleat 102 for supporting the one or more removable trays 100 of the container 18. According to the various embodiments, each removable tray 100 can include an operable handle 104 that can be folded downward to a storage position 106 when the removable tray 100 is disposed within the interior volume 20 of the container 18. It is contemplated that the operable handle 104 can be rotated upward to a use position 108 and used as a handle 104 for carrying the removable tray 100 from the container 18 to another position and then returning the removable tray 100 to the interior volume 20 of the container 18. In order to carry the removable tray 100 in a substantially stable configuration, the operable handle 104 can be lockable in the use position 108, or the removable tray 100 can include at least two operable handles 104 positioned at outer edges of the removable tray 100 for carrying the removable tray 100 in a substantially stable configuration.

According to the various embodiments, it is contemplated that each removable tray 100 can include one or more tray storage features that can include, but are not limited to, tray dividing walls, hooks, pockets, interior shelves, sub-trays, and other smaller storage compartments for organizing various items within the removable tray 100 of the container 18.

Referring again to FIGS. 1-7, it is contemplated that substantially large or heavy items can be installed within the interior volume 20 of the container 18. In such circumstances, it is contemplated that additional vertical support may be necessary to properly secure the vehicle-bed storage box 10 to the vehicle-bed sidewall 28. In such situations, it is contemplated that at least one stanchion 120 can be configured to extend from the container 18 and rest upon a floor surface 122 of the vehicle bed 14 when the interface bracket 30 is received by the interface plate 26. In such a configuration, the at least one stanchion 120 can provide supplemental vertical support to the container 18 from below. Where the at least one stanchion 120 is implemented, it is contemplated that the stanchion 120 is a supplemental supporting member such that the primary vertical, lateral, rotational, and tilting support is provided by the engagement between the interface bracket 30 and the interface plate 26. Accordingly, when the at least one stanchion 120 is implemented as part of the supplemental support of the container 18, the foot 124 of the stanchion 120 can be substantially free of mechanical engagement of the floor surface 122 of the vehicle bed 14, such that the foot 124 of the stanchion 120 simply rests upon the floor surface 122 of the vehicle bed 14. Alternatively, it is contemplated that the floor surface 122 of the vehicle bed 14 can include a stanchion receptacle 126 for receiving the foot 124 of the stanchion 120 that can be used to prevent rattling, vibration, and other similar deflection of the stanchion 120 during use of the vehicle 16.

Referring again to FIGS. 1-4, it is contemplated that the exterior surface 140 of the container 18 can include various storage mechanisms that can include, but are not limited to, hooks, pockets, drawers 142, shelves, and other similar storage mechanisms that can be used to store and organize items to be disposed within the container 18. Where a drawer 142 is implemented into the container 18, it is contemplated that the panel 144 of the drawer 142 can define part of the exterior surface 140 of the container 18 and the drawer 142 extends into the interior volume 20 such that the drawer 142 can be slid between various positions to prevent access or to access the drawer 142 or drawers 142 of the container 18. In order to secure the drawers 142 in the closed position, it is contemplated that each drawer 142 can include a locking mechanism 146, such as a keyed cylinder 148, that can substantially secure the drawer 142 within the interior volume 20 during operation of the vehicle 16.

Referring again to FIGS. 3-7, the container 18 can include an operable lid 160 disposed proximate the upper rim 60 of the container 18. According to the various embodiments, the lid 160 of the container 18 can be connected to one of the sidewalls 22 through a hinge 162, such as a piano hinge, several individual hinges, or other similar rotational mechanism to operate the lid 160 between open and closed positions 164, 166. It is also contemplated that the lid 160 can include a locking mechanism 146, such as a keyed cylinder 148, tab, latch, hook and latch, and other similar locking mechanism 146 that can secure the lid 160 in the closed position. In order to grasp the lid 160 to move the lid 160 between the closed and open positions 166, 164, the engagement between the lid 160 and the upper rim 60 of the container 18 can define a grasping recess 168 that the user of the container 18 can utilize in order to grasp a portion of the lid 160 to move the lid 160 between the open and closed positions 164, 166. It is contemplated that the grasping recess 168 can be defined by an indent in either the sidewall 22 of the container 18 or the lid 160 that allows the user to place their hand within the grasping recess 168 to hold and operate the lid 160. Additionally, when the interface bracket 30 is engaged with the interface plate 26, a portion of the upper rim 60 of the container 18 can be configured to have a minimal clearance between the upper rim 60 of the container 18 and the top surface 64 of the vehicle-bed sidewall 28. Accordingly, the grasping recess 168 can define a clearance area through which the user can place their hand in order to grasp the lid 160 and operate the lid 160 between the open and closed positions 164, 166. It is also contemplated that the lid 160 can include a bracket, chain, or other similar device to prevent over rotation of the lid 160 when the lid 160 is moved to the open position 164. This mechanism can also include an open-retaining mechanism that substantially holds the lid 160 in the open position 164 to prevent unintentional closing of the lid 160 during use.

Referring again to FIGS. 3-7, the interface bracket 30 of the container 18 can include the rotating mechanism 38 that operates between an engaged position 40 and the secured position 42 when the interface bracket 30 is received by the interface plate 26. According to various embodiments, the rotating mechanism 38 can include a securing flange 180 that is substantially free of engagement with the interface plate 26 when the rotating mechanism 38 is in the engaged position 40. In this manner, the securing flange 180 can be engaged with the interface plate 26 and the container 18 can be held in a substantially fixed position through the engagement between the rotating mechanism 38 and the interface plate 26. However, it is contemplated that when the securing flange 180 is in the engaged position 40, the interface bracket 30 can be removed from the interface plate 26 by hand and without the use of tools, such that the container 18 can be installed and removed from the vehicle bed 14 as desired. Alternatively, when the interface bracket 30 is installed within the interface plate 26 and the rotating mechanism 38 moves into the securing flange 180 to the secured position 42, the interface bracket 30 can be selectively locked within the interface plate 26 to prevent unintentional removal of the interface bracket 30 from the interface plate 26. Accordingly, in the secured position 42, the container 18 is substantially unable to be removed from the interface plate 26, until such time as the securing flange 180 is moved back to the engaged position 40.

Referring again to FIGS. 3-7, the rotating mechanism 38 of the interface bracket 30 can include a rotational member 190 that operates the oblong flange 50 between the engaged and secured positions 40, 42. It is contemplated that the rotational member 190 can extend through the sidewall 22 of the container 18 such that the rotating mechanism 38 is operable from the interior volume 20 of the container 18. In this manner, the rotating mechanism 38 can only be removed from the engaged to the secured position 42 when the lid 160 is in the open position 164. Accordingly, the user of the container 18 can substantially lock the container 18 in position against the vehicle-bed sidewall 28 and prevent undesired removal of the container 18 from the vehicle-bed sidewall 28 by locking the lid 160 in the closed position. Accordingly, the rotational member 190 disposed within the interior volume 20 of the container 18 can be substantially inaccessible when the lid 160 is locked in the closed position.

Referring again to FIGS. 5-7, it is contemplated that the sidewall 22 of the container 18 can include a rotational housing 200 that holds and secures the rotating mechanism 38 and the rotational member 190 in a predetermined position within the interior volume 20 of the container 18. Accordingly, in the various embodiments, the rotating mechanism 38 can be a knob, lever, dial, or other grasping member that the user of the container 18 can rotate, move, or otherwise operate in order to operate the securing flange 180 between the engaged and the secured positions 40, 42. Additionally, it is contemplated that the rotating mechanism 38 can include a keyed cylinder 148 for locking the securing flange 180 in either the engaged or secured positions 40, 42. According to the various embodiments, the keyed cylinder 148 can be operated to lock and unlock the rotational member 190, illustrated, for exemplary purposes, as a knob. In this manner, the user may only operate the rotational member 190 when the keyed cylinder 148 is in the unlocked position. It is also contemplated that the rotating mechanism 38 can itself be the keyed cylinder 148 such that the rotating mechanism 38 can only be rotated between the secured and engaged positions 42, 40 through the use of a key for operating the keyed cylinder 148. In such an embodiment, operation of the keyed cylinder 148 serves to rotate the securing flange 180 between the engaged and secured positions 40, 42.

Referring now to the various embodiments illustrated in FIGS. 8-11, it is contemplated that the interface bracket 30 of the container 18 can include a two-part mechanism 210 that includes a container bracket 212 and the locking bracket 214. According to the various embodiments, the container bracket 212 can be secured to the sidewall 22 of the container 18 and is configured to extend outward in a substantially perpendicular configuration. The container bracket 212 can include a sliding flange 216 that defines an outward portion of the container bracket 212. It is contemplated that the sliding flange 216 is configured to engage a flange recess 218 of the locking bracket 214 such that when the sliding flange 216 is engaged within the flange recess 218, the container bracket 212 and locking bracket 214 form a unitary locking assembly 220 that can be installed within the interface plate 26. The interface plate 26 can include a slot 52 that is configured to receive the container bracket 212 and locking bracket 214, connected as the unitary locking assembly 220, to define either the engaged or the secured position 40, 42 of the rotating mechanism 38.

Figure 10:
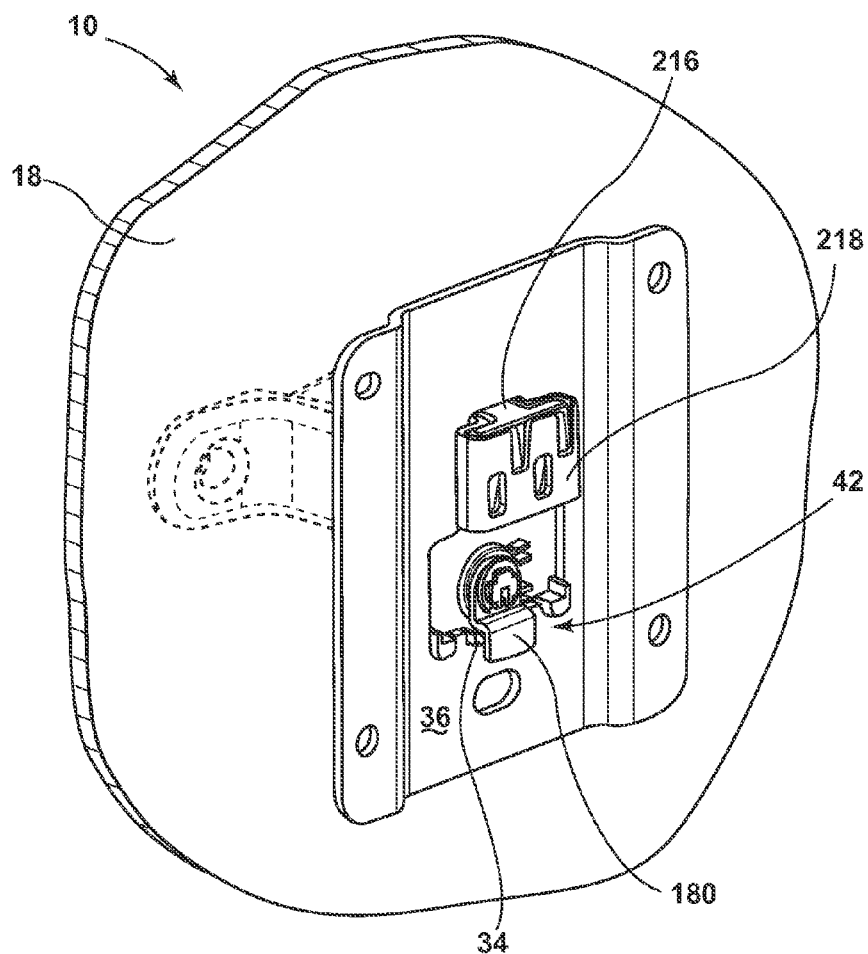
FIG. 10 is a rear perspective view of the standard interface plate connection method of FIG. 8 with the bracket installed within the interface plate and the cylinder moved to the blocked position.
Figure 11:
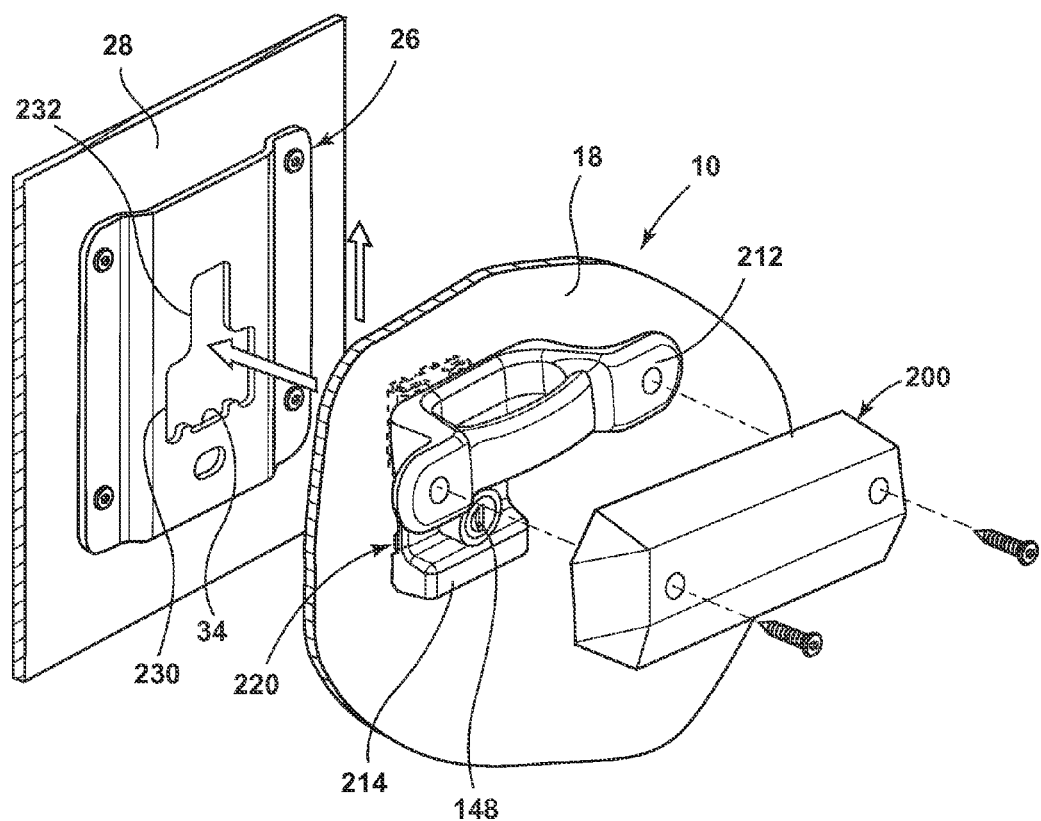
FIG. 11 is a top perspective view of the movement of the standard interface connection mechanism of FIG. 8 being installed within the standard interface plate.

Referring now to FIG. 10, when the sliding flange 216 of the container bracket 212 is secured within the flange recess 218 of the locking bracket 214, to define the unitary locking assembly 220, and the unitary locking assembly 220 is disposed within the slot 52 of the interface plate 26, the container bracket 212 is substantially secured within the slot 52 of the interface plate 26 and is unable to be removed from the locking bracket 214, unless the locking bracket 214 is first removed from the slot 52 of the interface plate 26. Additionally, the locking bracket 214 can include the rotating mechanism 38 that operates the securing flange 180. In this manner, the securing flange 180 can be a single flange member that extends outward from the rotating mechanism 38.

According to the various embodiments, and as discussed above, the rotating mechanism 38 can be a keyed cylinder 148 that rotates the securing flange 180 between the engaged and secured positions 40, 42. As also discussed above, when the securing flange 180 is engaged within the securing recess 34 of the interface plate 26, the interface bracket 30, which corresponds to the container bracket 212 and locking bracket 214, is secured within the slot 52 of the interface plate 26 and is unable to be removed until such time as the rotating mechanism 38 is moved back to the engaged position 40 such that the securing flange 180 is removed from a securing recess 34 of the interface plate 26. As with previous embodiments, the keyed cylinder 148 of the rotating mechanism 38 can be accessed only within the interior volume 20 of the container 18. It is also contemplated that in various embodiments, the container bracket 212 and the locking bracket 214 can be made of a single component rather than the two-part mechanism 210. In such an embodiment, the unitary locking assembly 220 is a single operable piece that can be inserted and removed from the slot 52 of the interface plate 26 and including the securing flange 180 that is operable between the engaged and secured positions 40, 42. According to the various embodiments, it is contemplated that the container bracket 212 and the locking bracket 214 can be integrated within the rotational housing 200 of the sidewall 22 of the container 18 such that the rotating mechanism 38 can be accessible through the interior volume 20 of the container 18 while also allowing the sliding flange 216 of the container bracket 212 and the securing flange 180 of the rotating mechanism 38 to engage the slot 52 of the interface plate 26 to lock the container 18 in position against the vehicle-bed sidewall 28 of the vehicle 16.

Referring again to FIG. 11, in order to engage the interface bracket 30 with the slot 52 of the interface plate 26, the interface bracket 30 can be moved inward through an enlarged portion 230 of the slot 52 and then slid upward through a narrowed portion 232 of the slot 52 in order to secure the sliding flange 216 within the narrowed portion 232 of the slot 52 of the interface plate 26. Once the sliding flange 216 is moved within the narrowed portion 232 of the slot 52, the portion of the locking bracket 214 having the securing flange 180 is moved into the enlarged portion 230 of the slot 52 such that the securing flange 180 can be positioned proximate the securing recess 34. Once positioned in this manner, the rotating mechanism 38 can be rotated from the engaged position 40 to the secured position 42, to move the securing flange 180 into the securing recess 34, thereby locking the container 18 in position, as discussed above.

Referring again to FIG. 9, the vehicle-bed sidewall 28 can include a recessed portion 240 that is configured to receive the interface plate 26. The recessed portion 240 of the vehicle-bed sidewall 28 is configured to position an outer surface 242 of the interface plate 26 to be substantially flush with the remainder of the vehicle-bed sidewall 28. Additionally, the cavity 244 of the vehicle-bed sidewall 28 can include a reinforcement structure 246 that is configured to receive both the interface plate 26 and the recess portion of the vehicle-bed sidewall 28 to substantially secure the interface plate 26 and allow the interface plate 26 to receive the various loads placed thereon when the vehicle-bed storage box 10 is engaged thereto.

As illustrated in FIGS. 1-11, the vehicle-bed storage box 10 is configured to engage the vehicle bed 14 such that the only mechanical or interference connection between the vehicle-bed storage box 10 and the vehicle-bed sidewall 28 is through the engagement of the interface bracket 30 and the interface plate 26. Accordingly, the only other contemplated engagement points between the vehicle-bed storage box 10 and the vehicle bed 14 are through the optional use of the one or more stanchions 120 that can be disposed between the base 24 of the container 18 and the floor surface 122 of the vehicle bed 14. As discussed above, such engagement between the stanchion 120 and the floor surface 122 is merely a surface connection and no mechanical or interference connection between the stanchion 120 and the vehicle bed 14 is required. According to various embodiments, the feet of each stanchion 120 can be optionally secured through a shoulder, raised or lowered portion or other stanchion receptacle 126 defined within the floor surface 122 of the vehicle bed 14 that at least partially surrounds and laterally supports the foot 124 of each stanchion 120.

Figure 2:
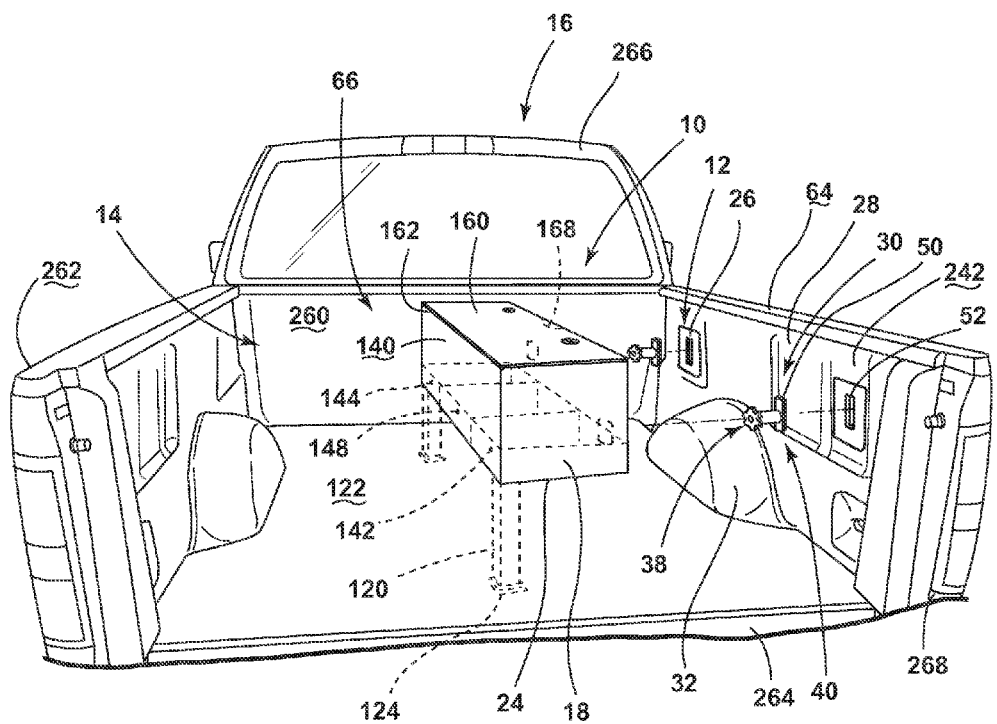
FIG. 2 is a partially exploded rear perspective view of the vehicle of FIG. 1 with the standard interface box removed from a sidewall of a vehicle.
Figure 4:
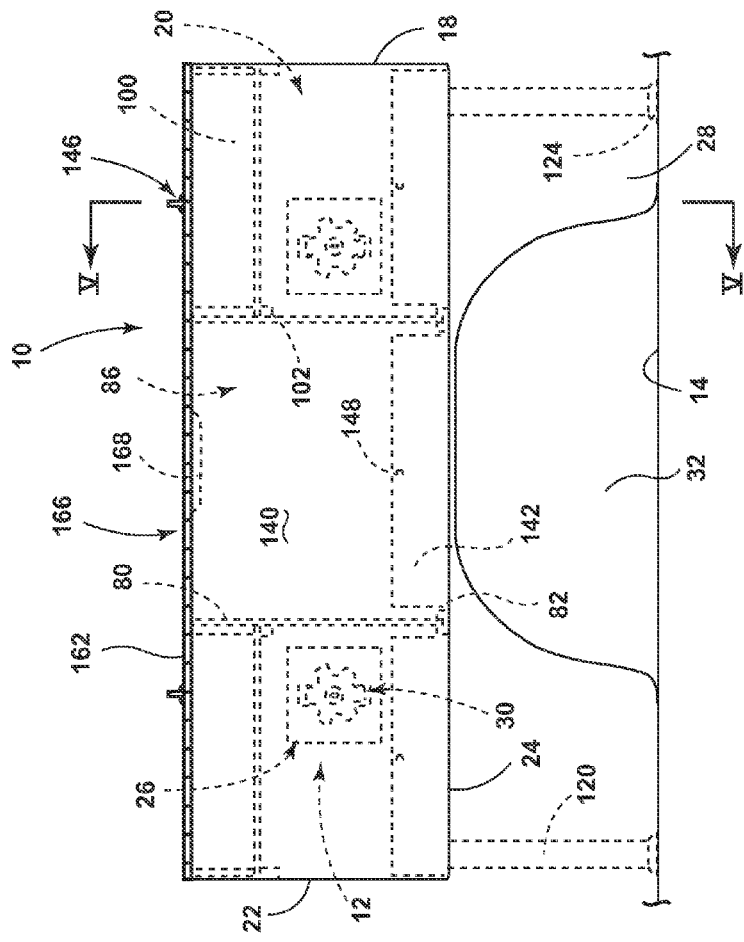
FIG. 4 is a side elevational view of the standard interface box of FIG. 4, shown in an engaged position.
Figure 3:
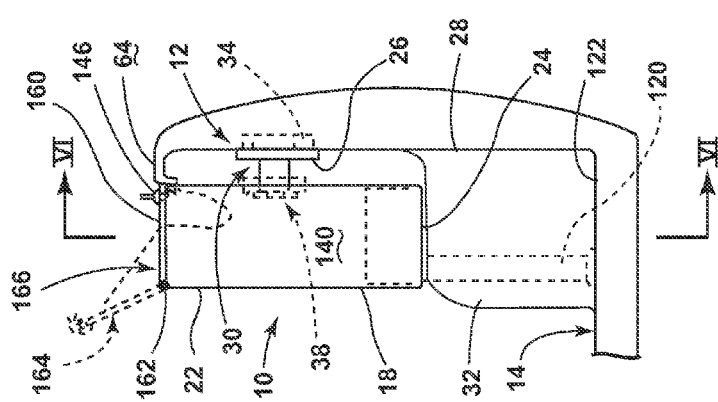
FIG. 3 is a rear elevational view of the standard interface box of FIG. 1.
Figure 6:
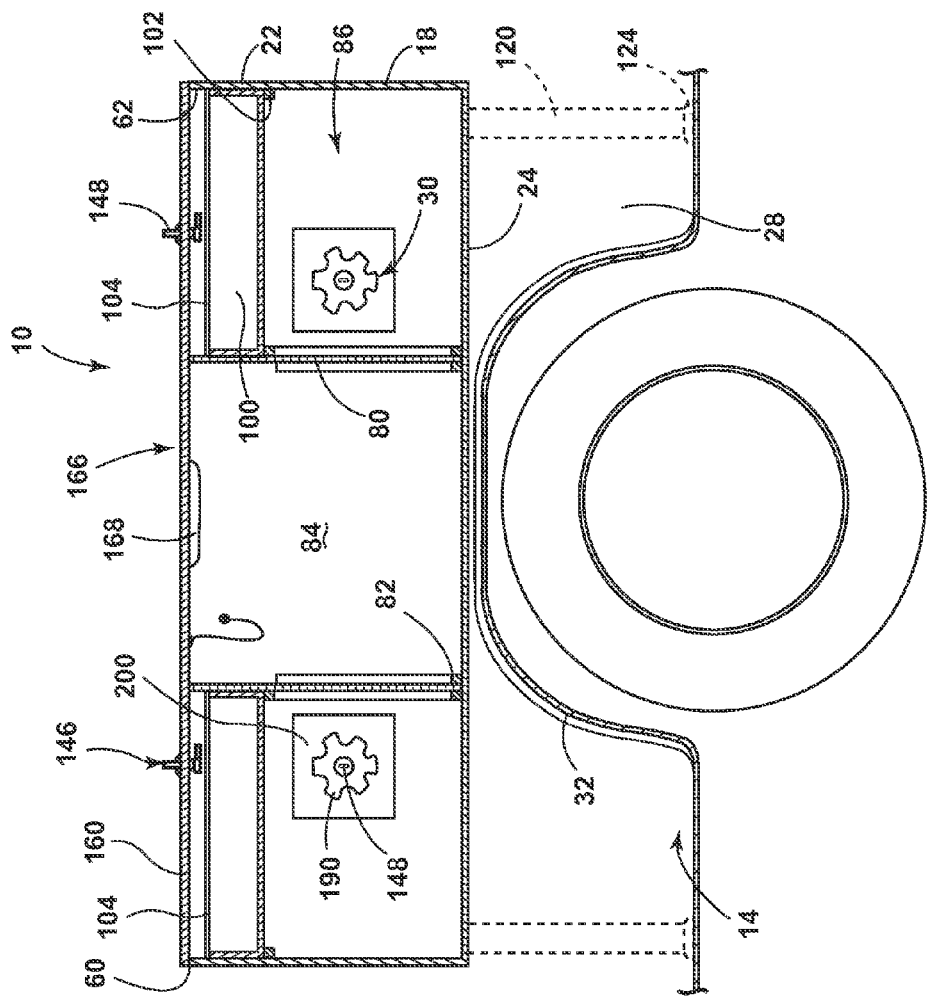
FIG. 6 is a cross-sectional view of the standard interface box of FIG. 3 taken along line VI-VI.
Figure 5:
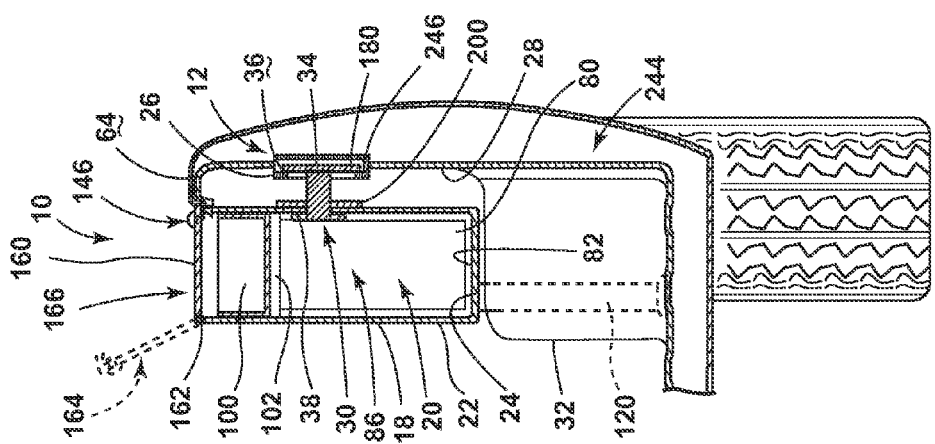
FIG. 5 is a cross-sectional view of the standard interface box of FIG. 4 taken along line V-V.
Figure 7:
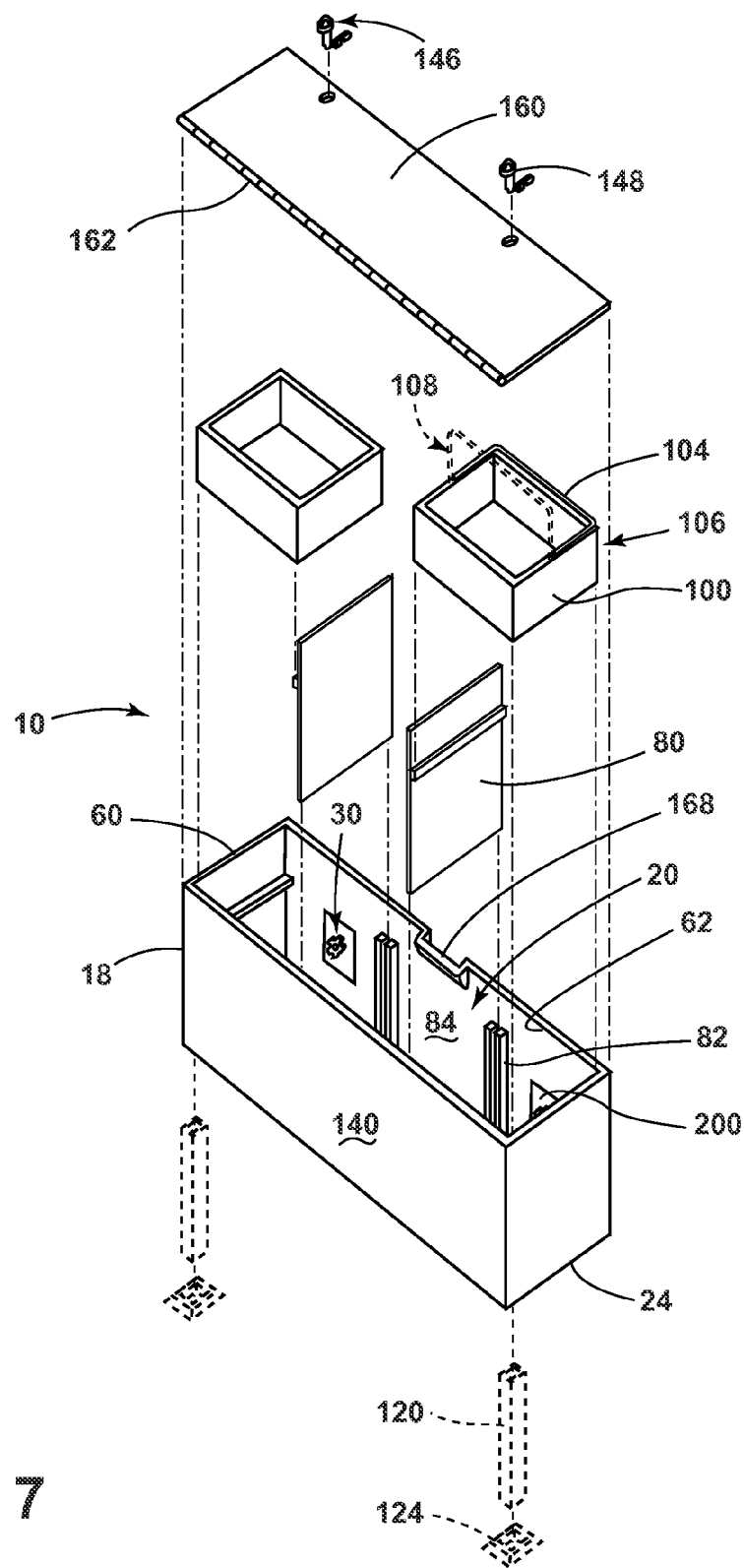
FIG. 7 is an exploded top perspective view of an embodiment of a standard interface box.
Figure 8:
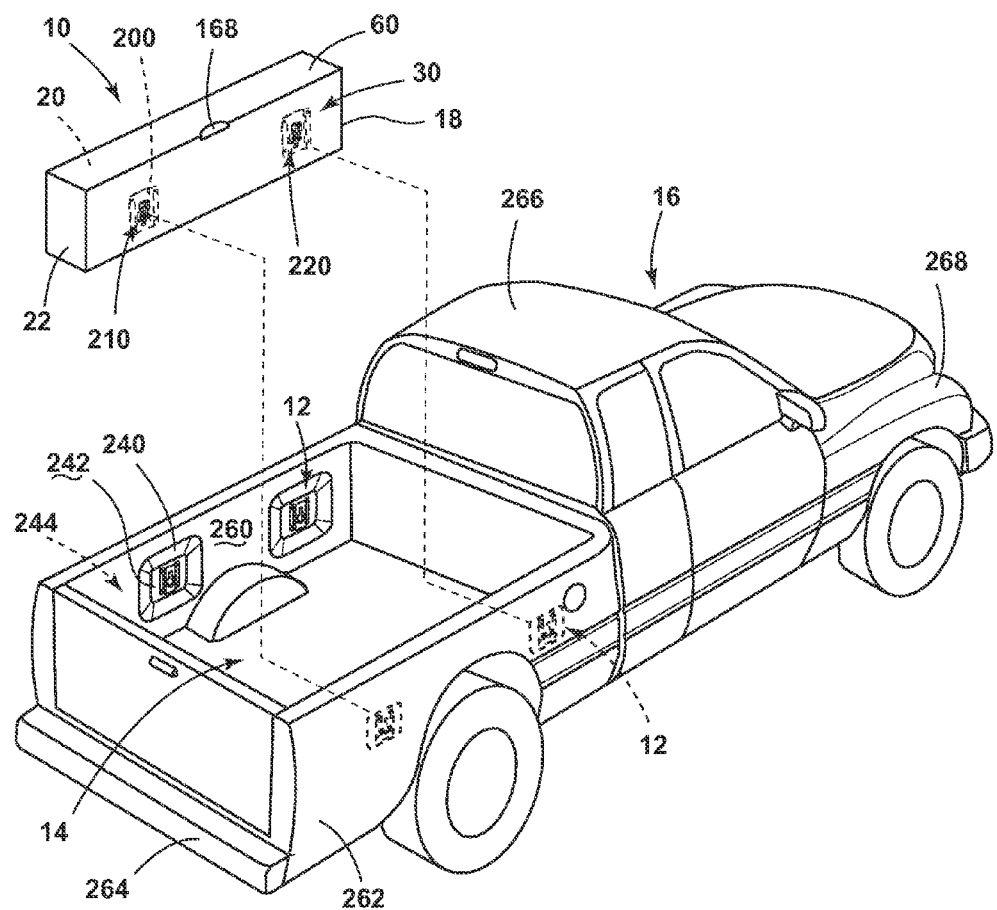
FIG. 8 is a partially exploded top perspective view of a vehicle incorporating an embodiment of the standard interface box having an alternate standard interface connection mechanism.
Figure 9:
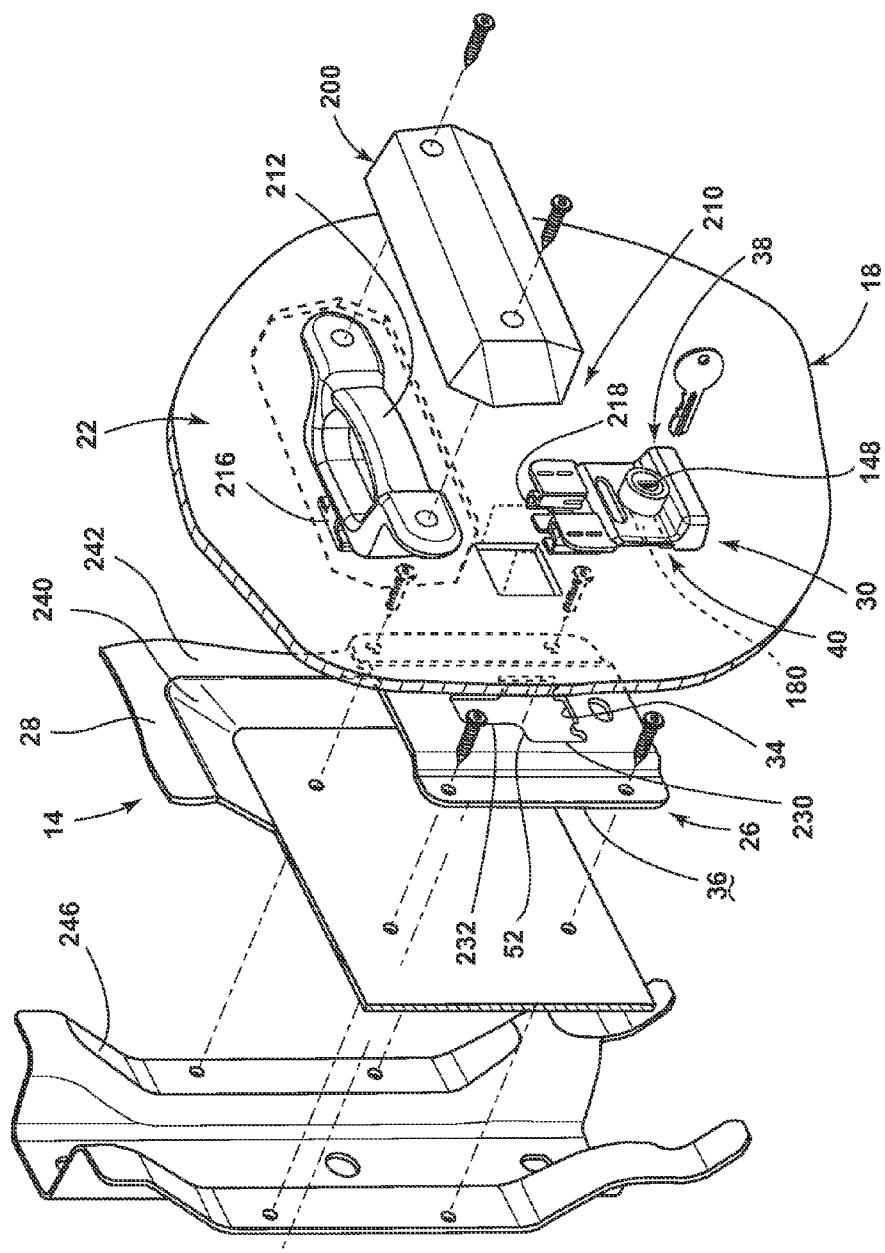
FIG. 9 is an exploded perspective view of the standard interface connection mechanism of FIG. 8, showing an exploded cut-away portion of the standard interface box.

According to the various embodiments, as exemplified in FIGS. 1 and 2, it is contemplated that the vehicle-bed storage box 10 can be installed on pickup trucks, as illustrated in the figures. However, it is also contemplated that the vehicle-bed storage box 10 can be installed in vehicles other than pickup trucks that can include, but are not limited to, support utility vehicles, sedans, vans, and other similar vehicles. In addition, while the vehicle-bed storage box 10 is shown to be installed on an inward facing surface 260 of the vehicle-bed sidewall 28, various embodiments of the vehicle-bed storage box 10 can include an installation mechanism on an outward facing wall 262 of the vehicle-bed sidewall 28. Alternate connection points of this type are configured such that the primary vertical and lateral support for the vehicle storage box 10 is in an outward facing surface of the vehicle 16, such as a bumper 264, cab 266, fender 268, or other substantially vertical surface that can support the vehicle-bed storage box 10. In such an embodiment, as discussed above, the primary lateral and vertical support for the vehicle-bed storage box 10 is via the interface bracket 30 being engaged with the interface plate 26 and the rotating mechanism 38 disposed in the secured position 42.

According to the various embodiments, it is contemplated that the vehicle-bed storage box 10 can include two or more interface brackets 30 that extend from the sidewall 22 to engage corresponding interface plates 26 of the vehicle-bed sidewall 28. It is contemplated that the number of interface brackets 30 and corresponding interface plates 26 to be implemented can be determined by various considerations that can include, but are not limited to, the size of the vehicle-bed storage box 10, the types of items to be stored within the vehicle-bed storage box 10, the material of the vehicle-bed storage box 10, and other similar considerations. By way of example, and not limitation, the vehicle-bed storage box 10 may be designed to be the size of a handheld toolbox such that the vehicle-bed storage box 10 can be installed and removed from the interface plate 26 with substantial ease by a single person by hand and without the use of tools. In such a configuration, the vehicle-bed storage box 10 can include a single interface bracket 30 that engages a single interface plate 26 defined within the vehicle-bed sidewall 28. In such a configuration, multiple vehicle-bed storage boxes 10 can be installed within a single vehicle-bed sidewall 28 such that each vehicle-bed storage box 10 can be installed and removed as desired by the user. Alternatively, the vehicle-bed storage box 10 may be a larger member that extends substantially the length of the vehicle-bed sidewall 28. In such a configuration, two or more interface brackets 30 can be defined within the sidewall 22 of the container 18 to engage two or more corresponding interface plates 26 defined within the vehicle-bed sidewall 28. In the various configurations described herein, the vehicle-bed storage box 10 is intended to be capable of installation and removal by an individual person and by hand and without the use of tools.

According to the various embodiments, the vehicle-bed storage box 10 can be made of various materials that can include, but are not limited to, plastics, metals, composites, combinations thereof, and other substantially rigid materials that can support loads, typically carried by the vehicle-bed storage box 10.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle-bed storage box comprising:
    a container having an interior volume defined by sidewalls and a base of the container;
    an interface plate disposed within a vehicle-bed sidewall that selectively receives the container against an inward surface of the vehicle-bed sidewall and suspended over a vehicle-bed wheelhouse, the interface plate including a securing recess at least partially defined by the inward surface of the interface plate, wherein when the container is received by the interface plate, the base of the container is free of direct engagement with the vehicle-bed sidewall and vehicle-bed wheelhouse; and
    an interface bracket extending from one sidewall of the container, the interface bracket including a rotating mechanism operable between a plurality of rotational positions, wherein the plurality of rotational positions of the rotating mechanism includes an engaged position and a secured position when the interface bracket is received by the interface plate, the engaged position being defined by the rotating mechanism being free of engagement with the securing recess and further defined by the interface bracket being at least partially operable within the interface plate, and wherein the secured position is defined by the rotating mechanism being engaged within the securing recess and the interface bracket being free of movement within the interface plate.

2. The vehicle-bed storage box of claim 1, wherein the rotating mechanism includes a rotational member that operates the rotating mechanism between the plurality of rotational positions, and wherein the rotational member extends through the at least one sidewall and is operable from the interior volume of the container.

3. The vehicle-bed storage box of claim 2, wherein the rotational member is a keyed cylinder.

4. A vehicle-bed storage box comprising:
    a container having sidewalls and a base that define an interior volume;
    an interface bracket extending from one sidewall of the container; and
    an interface plate disposed within a vehicle-bed sidewall that selectively receives the interface bracket to position the container against an inward surface of the vehicle-bed sidewall and suspended over a vehicle-bed wheelhouse; wherein only one sidewall of the container engages the inward surface;

the interface bracket extends perpendicularly from the at least one sidewall of the container;

the interface plate is positioned vertically within the vehicle-bed sidewall;

selective engagement between the interface bracket and the interface plate provides primary vertical support for positioning the container over the vehicle-bed wheelhouse;

the interface bracket includes a rotating mechanism that operates between an engaged position and a secured position when the interface bracket is received by the interface plate;

the rotating mechanism includes a securing flange that is free of engagement with the interface plate when the rotating mechanism is in the engaged position; and the securing flange extends into a securing recess of the interface plate when the rotating mechanism is in the secured position, wherein the secured position is further defined by a portion of the interface plate being secured between the securing flange and the at least one sidewall of the container.

5. The vehicle-bed storage box of claim 4, wherein the container includes an upper rim, and wherein the upper rim is disposed below a top surface of the vehicle-bed sidewall when the interface bracket is received by the interface plate, and wherein the base of the container is free of engagement with the vehicle-bed wheelhouse.

6. The vehicle-bed storage box of claim 5, wherein the remaining sidewalls of the container and the base are free of direct engagement with a vehicle-bed surface.

7. The vehicle-bed storage box of claim 4, further comprising:
a removable dividing wall, wherein the container includes at least one wall cleat positioned on an interior surface of the container, wherein the at least one wall cleat cooperates with the removable dividing wall to position the removable dividing wall within the interior volume.

8. The vehicle-bed storage box of claim 4, further comprising:
at least one stanchion that extends from the container and rests upon a floor surface of a vehicle bed when the interface bracket is received by the interface plate, wherein the at least one stanchion provides supplemental vertical support to the container from below.

9. The vehicle-bed storage box of claim 7, further comprising:
a removable tray selectively disposed within the interior volume of the container, wherein the interior surface of the container includes a tray cleat that supports the removable tray within the interior volume of the container.

10. The vehicle-bed storage box of claim 4, wherein the rotating mechanism includes a rotational member that operates the securing flange between the engaged and secured positions, and wherein the rotational member extends through the at least one sidewall and is operable from the interior volume of the container.

11. A vehicle-bed storage box comprising:
a container having a back wall, a base and an interior volume defined at least by the base;
an interface bracket disposed within the back wall and perpendicularly extending from an exterior surface of the container; and
an interface plate disposed within a vehicle-bed sidewall that selectively receives the interface bracket to position the container against the vehicle-bed sidewall and over a vehicle-bed wheelhouse; wherein
the interface bracket includes a rotating mechanism that operates between an engaged position and a secured position when the interface bracket is received by the interface plate, the engaged position being further defined by the interface bracket being at least partially operable within the interface plate, and the secured position being further defined by the interface bracket being free of movement within the interface plate;
the rotating mechanism includes a securing flange that is free of engagement with the interface plate when the rotating mechanism is in the engaged position; and
the securing flange extends into a securing recess of the interface plate when the rotating mechanism is in the secured position, the secured position being further defined by a portion of the interface plate being secured between the securing flange and the at least one sidewall of the container.

12. The vehicle-bed storage box of claim 11, wherein only one sidewall of the container engages the at least one vehicle-bed sidewall and wherein the remaining sidewalls of the container and the base are free of direct engagement with a vehicle-bed surface, and wherein the base of the container is free of engagement with the vehicle-bed wheelhouse.

13. The vehicle-bed storage box of claim 11, wherein the interface plate is positioned vertically within the vehicle-bed sidewall, and wherein selective engagement between the interface bracket and the interface plate vertically and laterally supports the container over the vehicle-bed wheelhouse, wherein the container is free of engagement with the vehicle-bed wheelhouse.

14. The vehicle-bed storage box of claim 13, wherein the container includes an upper rim, and wherein the upper rim is disposed below a top surface of the vehicle-bed sidewall when the interface bracket is received by the interface plate.

15. The vehicle-bed storage box of claim 11, wherein the rotating mechanism includes a rotational member that operates the securing flange between the engaged and secured positions, and wherein the rotational member extends through the at least one sidewall and is operable from the interior volume of the container.

16. The vehicle-bed storage box of claim 15, wherein the rotational member is a keyed cylinder.

* * * * *